Nov. 3, 1931.　　　A. E. RUTTER　　　1,830,040
COMBINATION RAKE AND TEDDER
Filed March 28, 1930　　　5 Sheets-Sheet 1

Inventor
Alvah E. Rutter
By: Fisher, Clapp, Soans & Pond
Attys.

Nov. 3, 1931.      A. E. RUTTER      1,830,040
COMBINATION RAKE AND TEDDER
Filed March 28, 1930      5 Sheets-Sheet 3

Nov. 3, 1931.  A. E. RUTTER  1,830,040
COMBINATION RAKE AND TEDDER
Filed March 28, 1930  5 Sheets-Sheet 4

Nov. 3, 1931.  A. E. RUTTER  1,830,040
COMBINATION RAKE AND TEDDER
Filed March 28, 1930   5 Sheets-Sheet 5
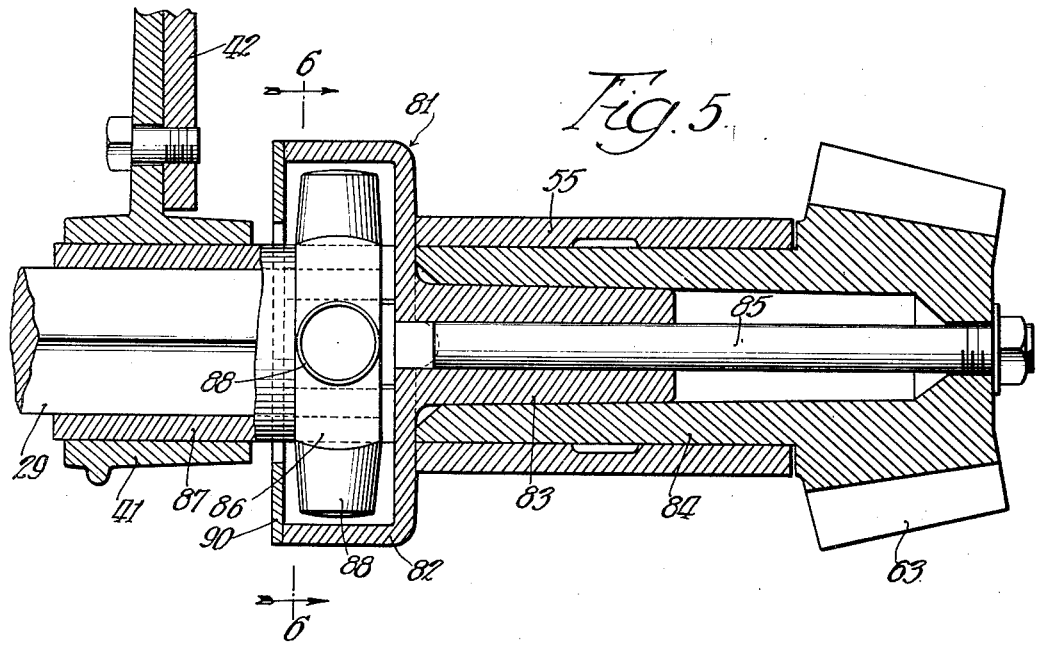
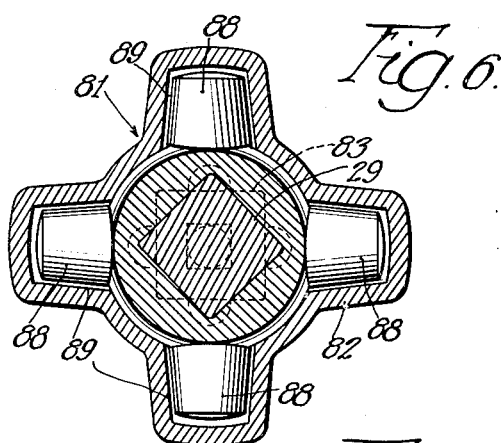
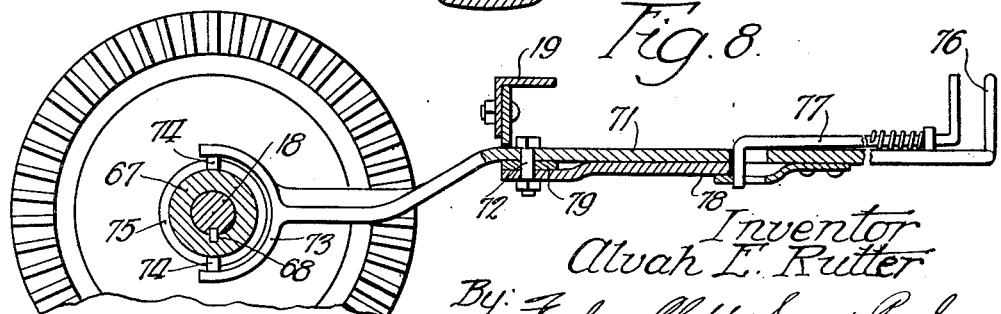
Inventor
Alvah E. Rutter
By: Fisher, Clapp, Soans & Pond
Attys.

Patented Nov. 3, 1931

1,830,040

UNITED STATES PATENT OFFICE

ALVAH E. RUTTER, OF ROCKFORD, ILLINOIS, ASSIGNOR TO J. I. CASE COMPANY, OF ROCKFORD, ILLINOIS, A CORPORATION OF ILLINOIS

COMBINATION RAKE AND TEDDER

Application filed March 28, 1930. Serial No. 439,563.

This invention relates to an implement of the type referred to having a rotated rake element proper, arranged diagonally with respect to the line of draft and operative to gather hay or the like, from the more or less evenly distributed position in which it is left in the usual tedding or mowing operation, into comparatively narrow rows for facilitating loading thereof on a hay-rack, and especially to facilitate such loading through the agency of the present day forms of automatic hay loaders.

Some of the objects of the invention are to provide in an implement of the class described, improved means for elevating the rake element proper out of operative position to facilitate transportation of the element on its own wheels from one place to another; to provide improved means for driving the rotated rake element proper while permitting raising or elevating of the same without impairing operativeness of the driving connection during adjustment of the height of the said rake element; to provide improved means for adjusting the vertical position of the said rake element; to provide means whereby the rake driving means may be readily disengaged to stop operation thereof; to provide means whereby the direction of rotation of the rake element may be reversed to adapt the implement for use as a tedder; and in general, it is the object of my invention to provide an improved implement of the class described.

Other objects and advantages of my invention will be understood by reference to the following specification and accompanying drawings (five sheets), in which I have illustrated a combination rake and tedder embodying a selected form of my invention.

In the drawings:

Fig. 5 is a section on the line 5—5 of Fig. 4.

Fig. 6 is a section on the lines 6—6 of Figs. 4 and 5.

Fig. 7 is a section on the line 7—7 of Fig. 3, and

Fig. 8 is a section on the line 8—8 of Fig. 4.

Figure 1:
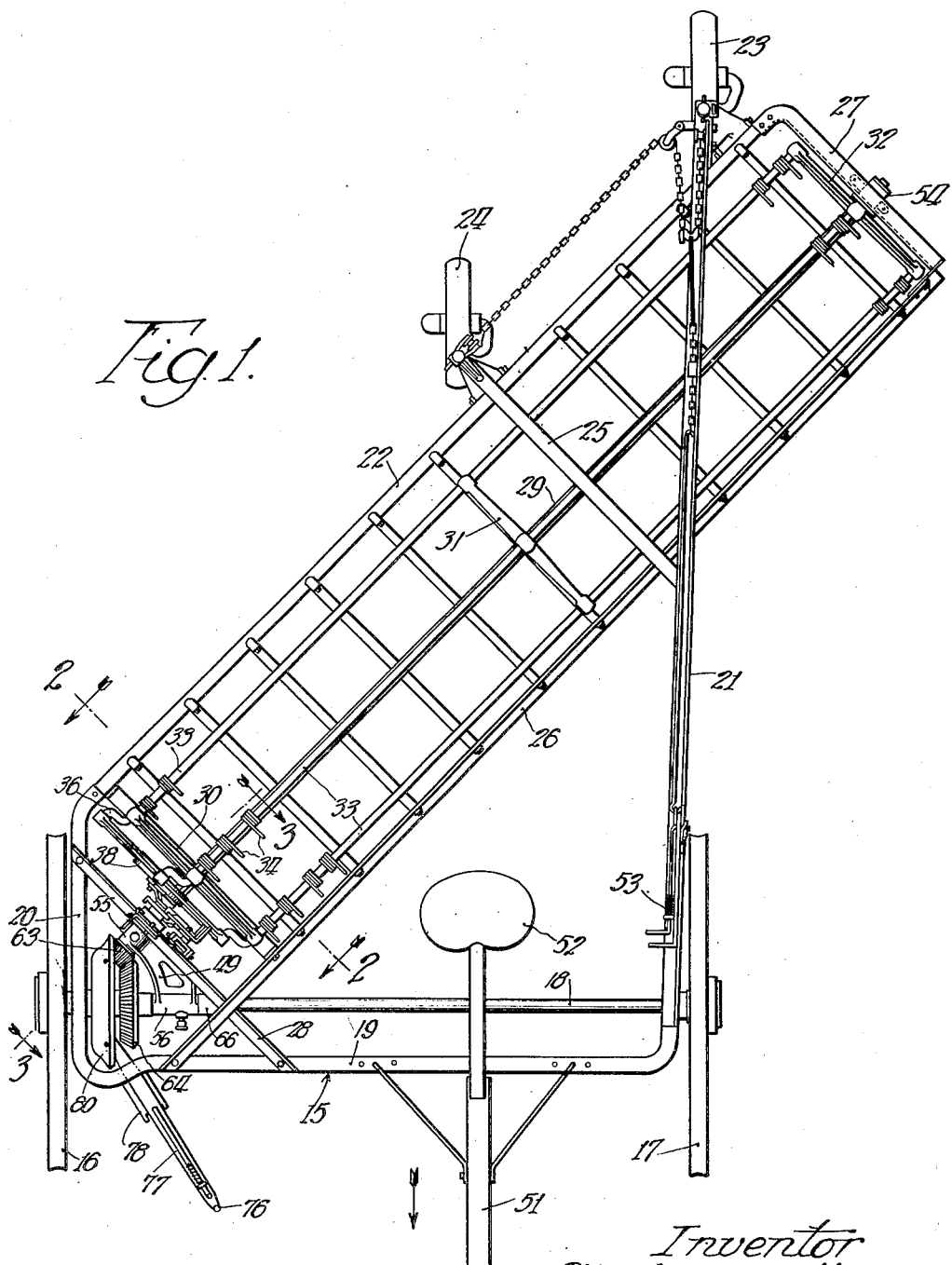
Fig. 1 is a plan.

Referring now to the drawings, my improved rake includes a main frame 15 of angle iron or other suitable construction, the same being supported at its front end by means of ground engaging wheels 16 and 17 through the agency of a shaft or axle 18. The main frame 15 includes the front member 19, a short rearwardly extending side member 20, a long rearwardly extending side member 21 and a rear diagonally extending member 22. The rear member 22 and long side member 21 are joined adjacent their intersection by means of a suitable bracket which receives a rear ground wheel 23, the latter being vertically adjustably mounted in the bracket.

A second rear ground wheel 24 is also vertically adjustably mounted in a bracket carried by the rear diagonally extending frame member 22, and a brace member 25 is provided for reinforcing the frame structure.

An auxiliary frame member 26, spaced forwardly from the rear frame member 22 and extending diagonally of the implement in parallelism with the rear member 22, is secured at its front end to the front member 19 and at its rear end is connected by means of a suitable end member 27 to the adjacent end of the rear frame member 22. Another auxiliary frame member 28, disposed substantially parallel to the end frame member 27 extends diagonally across the corner between the front frame member 19 and short side frame member 20.

Figure 2:
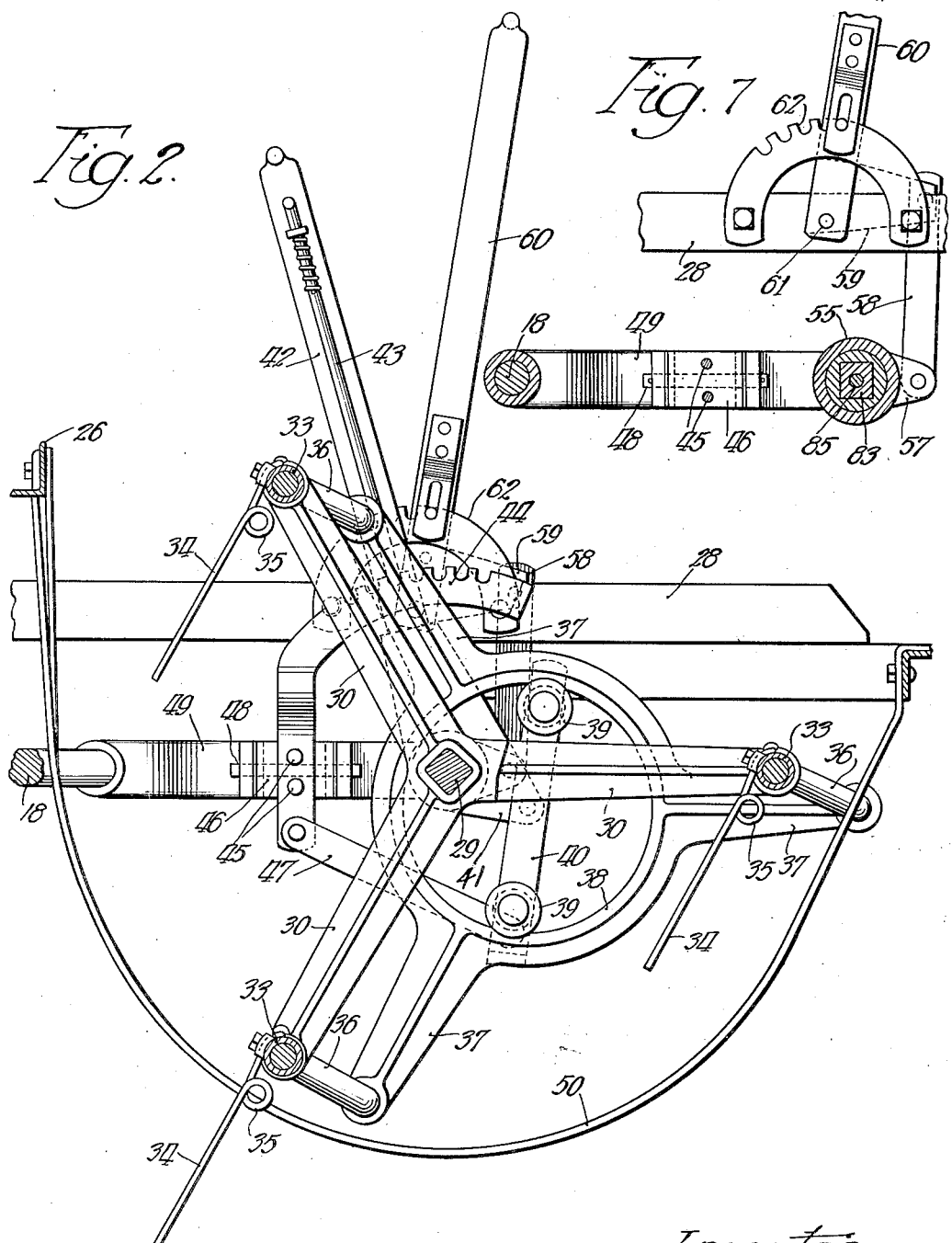
Fig. 2 is a section on the line 2—2, of Fig. 1, and also of Fig. 3.

The rake element proper or rotor comprises a shaft 29 on which is mounted in longitudinally spaced relation, a plurality of spiders 30, 31 and 32, each having preferably three arms as clearly shown for the spider 30 in Fig. 2 of the drawings. The ends of each of the spider arms are provided with bosses having bearing apertures for rotatably receiving rake-finger or prong supporting shafts 33, 33 on each of which a plurality of fingers or prongs 34 are mounted in longitudinally spaced relation.

The shafts 33, 33 are preferably in the form of tubular metal members so as to avoid excessive weight, and these tubular members may be provided with solid end portions fitting into the respective spider arm bearings. The fingers 34 are fixedly secured to the shafts 33, 33 in any suitable manner and are each preferably provided with a spring coil such as 35 intermediate its length so that the fingers may yield in the event that they come in contact with a relatively immovable object.

By reason of the rotatable mounting of the shafts 33, 33 in the spider arms, the fingers 34 may be adjusted to any desired angular position with respect to the vertical and mechanism is provided for maintaining the fingers constantly in set angular position with respect to the vertical while the same are revolved about the axis of the shaft 29. Mechanism which will hereinafter be described is provided for rotating the shaft 29 and the parts carried thereby.

For maintaining the rake fingers 34 in set or adjusted position, and for facilitating adjustment thereof, the following mechanism is provided. Each of the shafts 33 is provided with a crank arm end 36, the outer end of which is rotatably mounted in suitable bearing openings provided in the arms 37, 37 which extend radially outwardly from an annular member 38. The annular member 38 is rotatably supported by means of a pair of diametrically arranged rollers 39, 39 which are carried by a cross-bar 40, the latter being pivoted to an arm 41.

The arm 41 is rotatably mounted on a round section of the shaft 29 and is adjustable through the agency of an upwardly extending hand lever 42 which is provided with spring pressed means 43 having interlocking engagement with a toothed segment 44 for locking the hand lever and cross bar supporting arm 41 in the desired position of adjustment. The toothed segment 44 is supported by being rigidly mounted as shown at 45 on a bracket member 46. A link 47, which extends between the lower end of the segment 44 and the cross bar 40 serves to prevent the cross bar from turning on its pivotal connection with the arm 41.

The bracket 46 is pivotally mounted as shown at 48 on an adjustable arm 49 which will be subsequently more fully described. The axis of the pivot mounting 48 extends substantially at right angles to the axis of the rake shaft 29 and it will be seen that the segment member 44 is movable in unison with the rake shaft 29 and hand lever 42, such movement being incidental to vertical adjustment of the rake is hereinafter described.

By reason of the crank arm connections between the spider arms and the arms 37, 37 of the annulus 38, the annulus and its arms are rotated in unison with the shaft 29 and spider members carried thereby but on an axis offset with respect to the axis of the shaft 29. The shafts 33 which carry the rake fingers are thereby caused to rotate in unison with one another while at the same time revolving about the axis of the shaft 29, the angular position of the said fingers being thereby maintained constant.

To adjust the angular position of the fingers, the hand lever 43 is adjusted so as to raise or lower the annular member 38 and to correspondingly turn the shafts 33 in their bearings through the agency of the crank arms 36. Guard members such as shown at 50 are provided for stripping hay or the like off the fingers and for preventing hay from working upwardly into the operating mechanism of the implement. A suitable hitch bar or tongue 51 is connected to the front frame member 19 for facilitating draft of the implement, and an operator's seat 52 is also provided. Suitable mechanism, including a hand lever 53, is provided for effecting vertical adjustment of the rear ground wheels 23, 24 with respect to the rear part of the frame thereby to control or adjust the vertical position of the rear part of the implement. This rear adjusting mechanism is well-known to those skilled in the art, and since it forms no part of the present invention, it need not be more specifically described.

When the implement is to be transported from one place to another, for instance, from one field to another, it is desirable to elevate the rake element proper from the ground to a position wherein the fingers will clear the ground so that damage to the rake as an incident to engagement thereof with the ground or objects projecting therefrom is avoided. It is also desirable to provide vertical adjustment for the rake element to accommodate the same to different conditions encountered in use of the implement. By the above described hand lever 53 and vertical adjustable mounting of the rear ground wheels 23 and 24, the rear end of the implement is adjustable to meet the conditions above referred to.

When the rear end of the implement is elevated by the mechanism above described, the frame swings upwardly about the axle 18 as a fulcrum, the result being that the forward end of the rake is elevated only a small part of the distance which the rear end is elevated. The following described mechanism is provided for driving the rotatable rake element proper as an incident to the travel of the implement on its supporting wheels, and for facilitating elevation of the front end of the rake above the position to which it is normally elevated as an incident to the elevation of the rear end of the rake.

The rear end of the rake shaft 29 is rotatably mounted in a bearing 54 which is suitably anchored to the end frame member 27, preferably in such a way that the bearing can rock slightly in a vertical plane and about a fulcrum extending transversely of the rake shaft. The front end of the said rake shaft 29 is, in effect, rotatably mounted in a bearing 55 formed integral with the adjustable arm or link-bracket 49, the other end, 56 of which is rotatably mounted on the axle 18. Any suitable provision is made for preventing sliding movement of the bracket 49 along the axle 18.

Figure 3:
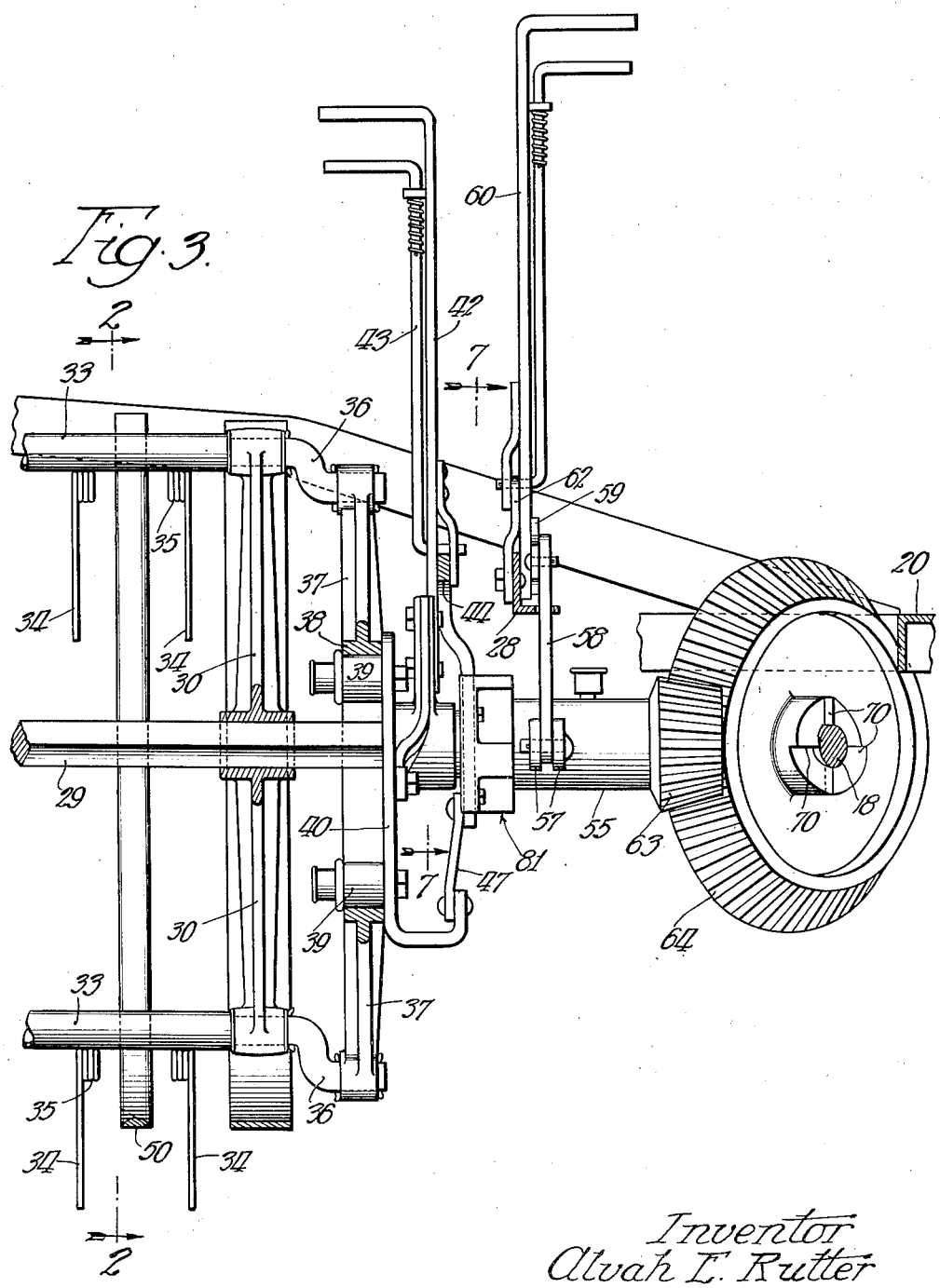
Fig. 3 is a section on the line 3—3 of Fig. 1.

The front end of the link bracket 49 is thus supported by the wheel axle 18, and for supporting the rear end or bearing end 55 of the bracket 49, I provide the arrangement best shown in Fig. 7. By reference to Figs. 3 and 7, it will be seen that the front end of the bracket is provided with a pair of lugs 57 to which is pivotally connected a link 58. The link 58 extends upwardly from the lug and is pivotally connected at its upper end to the free end of an arm 59, the latter being rigidly secured to a hand lever 60 which is pivoted as at 61 to the main frame member 28. The hand lever 60 is provided with hand and spring controlled locking means which cooperates with a toothed segment 62 which is rigidly secured to the said frame member 28. It will be seen that by swinging the hand lever 60 about its pivot 61, the rear end of the link bracket 49 will be correspondingly adjusted in a vertical direction. The adjustment of the rear end of the link bracket 49 obviously effects vertical adjustment of the front end of the rake shaft 29, this adjustment being in addition to the adjustment incidental to elevation of the rear end of the frame. It will also be noted that the above described extra adjustment of the front end of the shaft 29 makes it desirable to provide the adjustable mounting above referred to for the bearing member 54 and also the adjustable mounting above described for the toothed locking segment 44.

For driving the rake element proper, when the implement is used as a rake, I provide the forward end of the rake shaft 29 with a pinion gear 63 which meshes with a driving gear 64, the latter being rotatably mounted on the axle 18. The axle 18, at the adjacent side of the implement is rotatably mounted in bearings such as 65 and 66 which are secured to adjacent frame members as clearly shown in Fig. 4. The supporting wheel 16 is mounted on the outer end of the axle 18 in any suitable manner so that the said axle rotates as an incident to the travel of the implement. Suitable clutch means is provided for coupling the gear 64 to the driven shaft or axle 18 whereby the gear 64 will be operative to impart rotation to the pinion 63 and the rake shaft 29.

Figure 4:
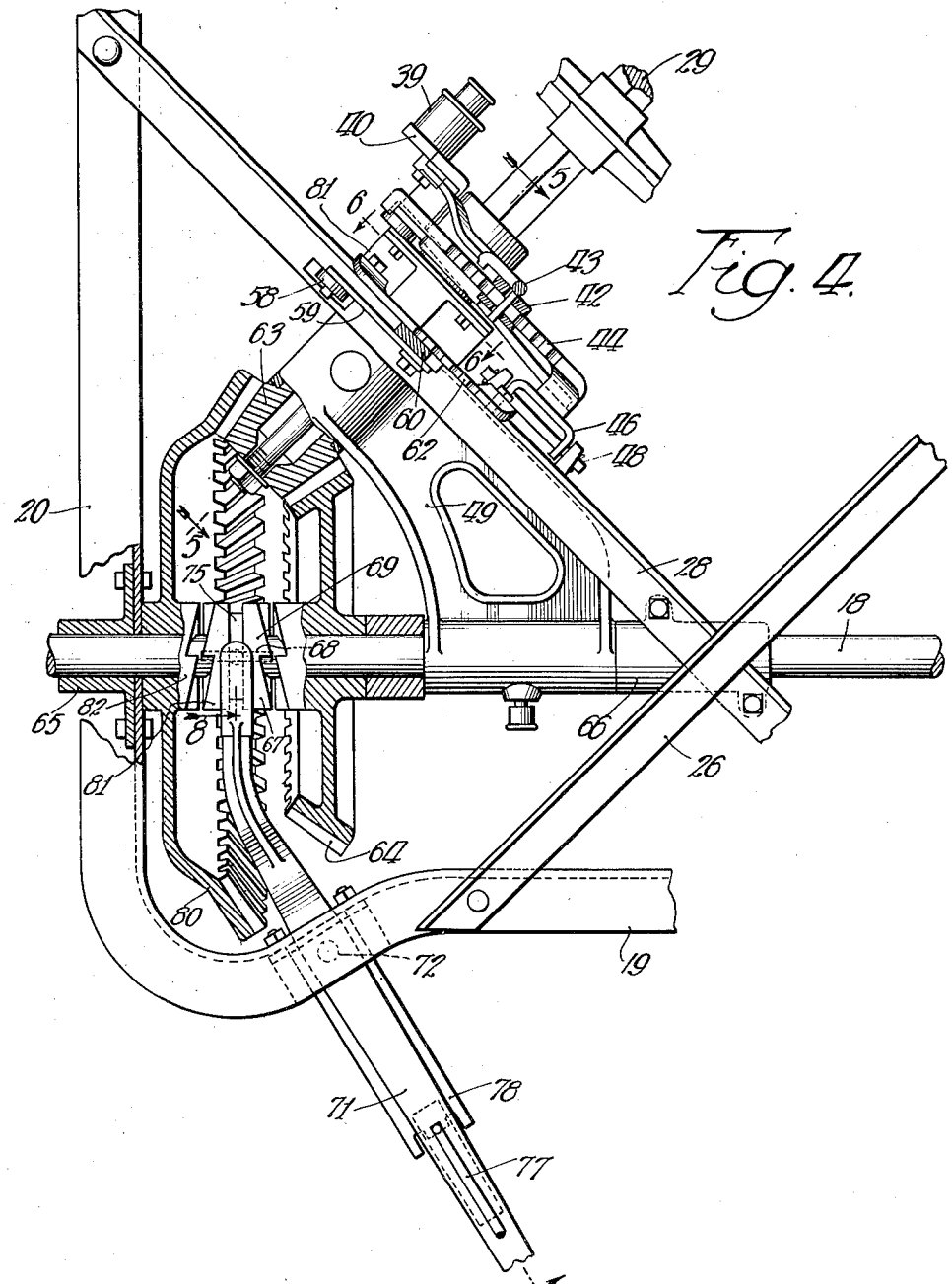
Fig. 4 is an enlargement of a portion of Fig. 1 showing certain details of construction.

The clutch mechanism above referred to may conveniently be of the type disclosed in Figs. 4 and 8, and includes a clutch collar 67 which is keyed or splined to the driven axle 18 as indicated at 68. The clutch collar 67 thus rotates with the axle and is free to slide lengthwise thereof. One end of the collar 67 is provided with a plurality of clutch teeth or jaws 69 which are adapted to interlock with similar teeth or jaws 70 formed on the adjacent face of the hub of the gear 64. The interlocking teeth or jaws 69 and 70 are arranged so that rotation of the shaft 18 and collar 69 as an incident to forward movement of the implement will be transmitted to the gear 64 and thereby to the pinion 63 and the rake.

The collar 67 may be controlled in any suitable manner, for instance by means of a hand lever 71 pivoted at 72 to a bracket depending from the front frame member 19. The rear end of the hand lever is provided with a forked end 73 having inwardly projecting pins 74 which fit in an annular groove 75 provided in the collar 67. The outer end of the lever is provided with a hand grip 76 and a spring controlled locking dog 77 which interlocks with a three place segment 78.

The segment 78 is in the form of a flat plate-like member having three notches formed in its outer end for receiving the locking dog 77, the inner end of the segment being secured by riveting, welding, or otherwise to the horizontal flange part 79 of the bracket which pivotally supports the clutch lever 71.

When the implement is to be used as a tedder, i. e. to turn, agitate, or change the position of mown hay or the like to hasten drying thereof, the angular position of the rake fingers is adjusted to suit by the hand lever 42 and the rake part is rotated in the reverse direction to that in which it is rotated when the implement is used as a rake.

For effecting such reverse rotation as an incident to forward movement of the implement, I provide an internal bevel gear 80 which meshes with the pinion 63 and which is rotatably mounted on the axle 18. The adjacent faces of the clutch collar 67 and hub of the internal gear 80 are provided with teeth or jaws 81 and 82 respectively which are adapted to be interlocked so that rotation of the axle 18 is transmitted through the collar 67 and internal gear 80 to the pinion 63 and rake.

It will now be understood that the three positions of the hand lever are arranged to hold the clutch collar 67 in engagement with either of the gears 64 or 80 and in neutral position as shown in Fig. 4. When the rake is adjusted vertically by means of the hand lever 60, the pinion 63 of the rake shaft 29 is, in effect, caused to roll around the gears 64 and 80 by reason of the link bracket 49 which swings around the axis of the axle 18.

When the pinion is adjusted in this manner, there occurs a certain amount of longitudinal and lateral relative movement between the pinion and the shaft 29 to which it is connected. To permit such relative movement while maintaining operative connections between the pinion and shaft, the following structure is provided.

A sort of universal joint indicated generally by the reference character 81 is provided. This universal joint may be of any suitable type, and in the present instance it consists of a housing member 82 having a square stud 83 fitting into a corresponding recess in the shank 84 of the pinion 63. The shank 84 of the pinion is rotatably mounted in the said bearing 55 and constitutes, in effect, an extension of the rake shaft 29. Suitable means such as the bolt means 85 as shown in Fig. 5 may be provided for locking the pinion 63 and universal joint housing 82 in assembled relation. The other part of the universal joint consists of a member 86 which is provided with a shank part 87 slidably but non-rotatably fitting on the end of the square rake shaft 29, and rotatably fitting in the opening of the hand lever casting member 41. The hand lever 42 is thus rotatably mounted on the shaft 29. The member 86 is provided with a plurality of round, slightly tapered bosses or rollers 88 which fit in suitable pockets 89 provided in the housing member 82.

It will be seen that rotation of the housing member 82 is transmitted to the member 86, and that the shaft 29 and pinion shank 84 may be axially offset within certain limits without affecting the driving connection therebetween. Also, the necessary amount of longitudinal movement of the shaft 29 with respect to the pinion 63 is permitted by reason of the longitudinal sliding fit of the shaft 29 in the shank part 87. A suitable closure plate 90 may be provided for closing the inner side of the housing 82 after the parts are assembled.

The driving connection between the gears 63, 64 and 80 is thus maintained in all positions of vertical adjustment of the rake and the mechanism is comparatively simple, free from complex parts which would be apt to get out of order, and it is durable and serviceable while being low in cost of manufacture. The above described structure is thus quite practical both as to the manufacturer and user. However, I am aware that changes may be made in the same without departing from the spirit of my invention, the scope of which should be determined by reference to the following claims, the same being construed as broadly as possible consistent with the state of the art.

I claim as my invention:

1. In an implement of the class described, the combination of a wheel-supported main frame, a rotatable rake including a shaft disposed obliquely with respect to the line of draft of the implement, a bearing for rotatably receiving the rear end of said shaft, means carried by said frame for supporting the front end of said shaft for vertical adjustment relative to the frame, selectively engageable means adjacent said front end for connecting said shaft to one of said wheels to effect rotation of the rake in either direction as an incident to forward movement of the implement, said means including a pinion gear connected to said shaft and adjustable therewith relative to said main frame, a pair of axially aligned gears mounted for rotation in axially fixed relation to said main frame and meshing with oppositely disposed portions of said pinion gear, means for selectively clutching said pair of gears to said wheel for rotation therewith, and means for maintaining said pinion gear in mesh with said pair of gears in all positions of vertical adjustment of said pinion gear with said rake relative to said frame.

2. In an implement of the class described, the combination of a main frame, an axle rotatably mounted in said frame, a ground-engaging wheel locked on said axle for causing the same to rotate as an incident to movement of the implement, a rotatable rake disposed obliquely of the normal line of draft of the implement and including a main shaft rotatably mounted at its rear end on said main frame, means for rotatably supporting the front end of said shaft for vertical adjustment relative to the frame, selectively engageable means for connecting said shaft to said axle to effect rotation of the rake in either direction as an incident to forward movement of the implement, said means including a pinion gear connected to said shaft and adjustable vertically therewith relative to said main frame, a pair of gears rotatably mounted on said axle and meshing with oppositely disposed portions of said pinion gear, means for selectively clutching said pair of gears to said axle for rotation therewith, and a link pivotally mounted on said axle in fixed position longitudinally thereof and rotatably supporting said pinion gear in operative engagement with said pair of gears, said pinion gear being thereby vertically adjustable with said rake relative to said main frame and circumferentially of said pair of gears while remaining in operative engagement therewith.

3. In an implement of the class described, the combination of a main frame having an axle extending across its front end and ground-engaging wheels mounted on said axle for supporting the front end of said frame, means for vertically, adjustably supporting the rear end thereof, a rotatable rake element carried by said frame and extending rearwardly from the front thereof, said rake including a main shaft, a plurality of auxiliary shafts having a plurality of prongs mounted thereon, said auxiliary shafts being mounted on said main shaft so as to be revoluble with said main shaft and also rotatable about their own axes whereby the angular position of said prongs is adjustable, a bearing carried by said main frame for rotatably receiving the rear end of said main shaft, means carried by said frame for vertically, adjustably supporting the front end of said main shaft, selectively engageable means for connecting said shaft to said axle to effect rotation of the rake in either direction as an incident to forward movement of the implement, said means including a pinion gear connected to said shaft and adjustable vertically therewith relative to said main frame, a pair of gears rotatably mounted on said axle and meshing with oppositely disposed portions of said pinion gear, means for selectively clutching said pair of gears to said axle for rotation therewith, and a link pivotally mounted on said axle in fixed position longitudinally thereof and rotatably supporting said pinion gear in angularly fixed axial relation to and in operative engagement with said pair of gears, said pinion gear being thereby vertically adjustable with said rake relative to said main frame and circumferentially of said pair of gears while remaining in operative engagement therewith, a flexible coupling between said main shaft gear and the main shaft permitting said parts to assume a position of axial disalignment as an incident to vertical adjustment of the front end of the main shaft, a lever pivotally mounted on said main shaft for controlling the angular position of said rake prongs, and a locking segment adjustably mounted on said link for vertical movement relative to said main frame in unison with vertical adjustment of the front end of the rake and laterally with said lever as an incident to said vertical rake adjustment.

4. In an implement of the class described, the combination of a wheel-supported main frame, a rotatable rake including a shaft disposed obliquely with respect to the line of draft of the implement, a bearing for rotatably receiving the rear end of said shaft, means carried by said frame for supporting the front end of said shaft for vertical adjustment relative to the frame, means adjacent said front end for connecting said shaft to one of the supporting wheels to effect rotation of said rake incident to forward movement of the implement, said last-mentioned means including a pair of intermeshing gears respectively connected for unitary rotation with said wheel and shaft, the shaft gear being vertically adjustable with the shaft relative to said main frame and circumferentially with respect to the wheel gear, and means for maintaining said gears in mesh in all positions of relative adjustment.

5. In an implement of the class described, the combination of a main frame having an axle extending across its front end and ground-engaging wheels mounted on said axle for pivotally supporting the front end of said frame, means for vertically, adjustably supporting the rear end thereof, a rotatable rake element carried by said frame and including a shaft through which the rake element is adapted to be rotated, said rake element extending diagonally rearwardly from the front of said frame, a bearing carried by said main frame for rotatably receiving the rear end of said rake shaft, means carried by said frame for vertically, adjustably supporting the front end of said rake shaft, a pair of intermeshing gears respectively connected to the front end of said rake shaft and to said axle for driving said rake shaft, a link pivotally adjustable about said axle and rotatably supporting said rake shaft gear in operative engagement with the axle gear, the rake shaft gear being thereby circumferentially adjustable around said axle gear independently of such adjustment as occurs as an incident to vertical adjustment of the rear end of the frame, and a flexible coupling between said rake shaft and its gear for permitting axial disalignment of said shaft and gear as an incident to vertical adjustment of the front end of the rake relative to the frame.

6. In an implement of the class described, the combination of a wheel-supported main frame, a rotatable rake carried by said frame and disposed obliquely of the normal line of draft of the implement, means for rotating said rake as an incident to forward movement of the implement comprising a pair of intermeshing gears respectively connected to said rake adjacent one end thereof and to one of the frame-supporting wheels, means for supporting said end of the rake and the gear connected thereto for vertical adjustment relative to the frame and other gear, and means for maintaining said gears in operative engagement with each other while permitting said relative vertical adjustment.

7. In an implement of the class described, the combination of a wheel-supported main frame, a rotatable rake carried by said frame and disposed obliquely of the normal line of draft of the implement, and means for rotating said rake comprising a drive gear carried by said main frame adjacent the front end of said rake, a gear operatively connected to said rake and meshing with said drive gear, means carried by said frame for supporting the front end of said rake and the gear connected thereto for vertical adjustment relative to said main frame and drive gear, and means for maintaining said gears in operative engagement with each other while permitting said relative vertical adjustment.

8. In an implement of the class described, the combination of a main frame, an axle rotatably mounted in said frame, a ground-engaging wheel locked on said axle for causing the same to rotate as an incident to movement of the implement, a rotatable rake disposed obliquely of the normal line of draft of the implement and including a main shaft rotatably mounted at its rear end on said main frame, means for rotatably supporting the front end of said shaft for vertical adjustment relative to the frame, a driving connection between said axle and rake shaft comprising a pair of intermeshing gears respectively connected to the front end of said shaft and said axle for rotation therewith, and a link pivotally mounted at one end on said axle and rotatably supporting said rake shaft gear in operative engagement with said axle gear, said rake shaft gear being thereby vertically adjustable relative to said frame in unison with the rake and circumferentially of said axle gear while in operative engagement therewith.

9. In an implement of the class described, the combination of a main frame, an axle rotatably mounted in said frame, a ground-engaging wheel locked on said axle for causing the same to rotate as an incident to movement of the implement, a rotatable rake disposed obliquely of the normal line of draft of the implement and including a main shaft rotatably mounted at its rear end on said main frame, means for rotatably supporting the front end of said shaft for vertical adjustment relative to the frame, a driving connection between said axle and rake shaft comprising a pair of intermeshing gears respectively connected to the front end of said shaft and said axle for rotation therewith, a link pivotally mounted at one end on said axle and rotatably supporting said rake shaft gear in operative engagement with said axle gear, said rake shaft gear being thereby vertically adjustable relative to said frame in unison with the rake and circumferentially of said axle gear while in operative engagement therewith, and a flexible coupling interposed between said rake shaft gear and rake shaft for permitting axial disalignment of the gear and shaft as an incident to said vertical adjustment of the front end of said rake shaft.

10. In an implement of the class described, the combination of a wheel-supported main frame, a rotatable rake element disposed obliquely of said axle and including a main shaft, a plurality of auxiliary shafts rotatably adjustably mounted in fixed relatively spaced relation on said main shaft and a plurality of prongs carried by said auxiliary shafts, means for vertically adjustably supporting the front end of said shaft including a link pivotally connected at one end to said main frame and rotatably receiving the front end of said main shaft at its other end, a hand lever pivotally mounted on said main shaft for controlling rotatable adjustment of said auxiliary shafts and thereby the angular position of said rake prongs, and a locking segment for holding said lever in adjusted position, said segment being adjustably mounted on said link for movement relative to said main frame vertically in unison with the vertical adjustment of said rake and laterally with said lever as an incident to said vertical adjustment.

11. In an implement of the class described, the combination of a main frame having an axle and a ground-engaging wheel mounted thereon for supporting the front end of said frame, a rotatable rake element disposed obliquely of said axle and including a main shaft, a plurality of auxiliary shafts rotatably adjustably mounted in fixed relatively spaced relation on said main shaft, and a plurality of prongs carried by said auxiliary shafts, means for vertically adjustably supporting the front end of said main shaft including a link pivotally adjustably mounted at one end on said axle and rotatably receiving the front end of said main shaft at its other end, said front end being thereby maintained in pivotally adjustable but fixedly spaced relation to said axle, a pair of intermeshing gears carried respectively by said axle and the front end of said shaft for rotating said rake as an incident to forward travel of the implement, a lever pivotally mounted on said main shaft for controlling rotatable adjustment on said auxiliary shafts and thereby the angular position of said rake prongs, and a locking segment adjustably mounted on said link for vertical movement relative to said main frame in unison with vertical adjustment of the front end of the rake and laterally with said lever as an incident to said vertical rake adjustment.

ALVAH E. RUTTER.